United States Patent
Gruenewald et al.

(10) Patent No.: US 10,414,116 B2
(45) Date of Patent: *Sep. 17, 2019

(54) SANDWICH COMPONENT AND METHOD FOR PRODUCING A SANDWICH COMPONENT

(71) Applicant: Airbus Defence and Space GmbH, Ottobrunn (DE)

(72) Inventors: Jonas Gruenewald, Munich (DE); Patricia Parlevliet, Munich (DE); Thomas Meer, Egmating (DE)

(73) Assignee: Airbus Defence and Space GmbH, Ottobrunn (DE)

(*) Notice: Subject to any disclaimer, the term of this patent is extended or adjusted under 35 U.S.C. 154(b) by 482 days.

This patent is subject to a terminal disclaimer.

(21) Appl. No.: 14/719,774

(22) Filed: May 22, 2015

(65) Prior Publication Data
US 2015/0336350 A1 Nov. 26, 2015

(30) Foreign Application Priority Data
May 23, 2014 (DE) .................. 10 2014 007 511

(51) Int. Cl.
*B32B 3/12* (2006.01)
*B32B 7/00* (2006.01)
(Continued)

(52) U.S. Cl.
CPC ............ *B32B 3/12* (2013.01); *B29B 11/04* (2013.01); *B29B 11/14* (2013.01); *B32B 7/04* (2013.01);
(Continued)

(58) Field of Classification Search
None
See application file for complete search history.

(56) References Cited

U.S. PATENT DOCUMENTS 4,671,985 A * 6/1987 Rodrigues ............... B32B 15/08
428/215
5,683,782 A * 11/1997 Duchene .................. B32B 3/12
428/116
(Continued)

FOREIGN PATENT DOCUMENTS

DE 1 238 191 B 4/1967
DE 196 04 611 A1 8/1997
(Continued)

OTHER PUBLICATIONS

European Search Report issued in European counterpart application No. 15001549.3-1303, dated Oct. 26, 2015, with Statement of Relevancy (Five (5) pages).

(Continued)

*Primary Examiner* — Daniel J. Schleis
(74) *Attorney, Agent, or Firm* — Crowell & Moring LLP

(57) ABSTRACT

A sandwich component has a first cover layer, a second cover layer, and a core disposed therebetween. In the sandwich component, the cover layers are each formed from an outer layer made of a fiber-reinforced thermoplast material having greater resistance to a certain solvent and, fused therewith, an inner layer made of a thermoplast material having lower resistance to the solvent. The core has outer layers, each of which is formed from a thermoplast material having lower resistance to the solvent, and an inner structure, which is formed entirely or partially from a thermoplast material having greater resistance to the solvent. The inner layers of the cover layers were each fused with one of the outer layers of the core with the use of the solvent.

3 Claims, 3 Drawing Sheets

(51) Int. Cl.
*B32B 37/04* (2006.01)
*B32B 38/00* (2006.01)
*B29B 11/04* (2006.01)
*B29B 11/14* (2006.01)
*B32B 27/08* (2006.01)
*B32B 27/28* (2006.01)
*B32B 7/04* (2019.01)
*B32B 27/04* (2006.01)
*B32B 37/14* (2006.01)
*B32B 37/00* (2006.01)
*B32B 37/18* (2006.01)
*B29C 53/04* (2006.01)
*B29C 65/00* (2006.01)
*B29C 65/48* (2006.01)
*B29K 671/00* (2006.01)
*B29K 679/00* (2006.01)
*B29K 71/00* (2006.01)
*B29K 79/00* (2006.01)

(52) U.S. Cl.
CPC .............. *B32B 27/04* (2013.01); *B32B 27/08* (2013.01); *B32B 27/281* (2013.01); *B32B 37/0038* (2013.01); *B32B 37/04* (2013.01); *B32B 37/146* (2013.01); *B32B 38/0012* (2013.01); *B29C 53/04* (2013.01); *B29C 65/4895* (2013.01); *B29C 66/006* (2013.01); *B29C 66/112* (2013.01); *B29C 66/114* (2013.01); *B29C 66/5346* (2013.01); *B29C 66/71* (2013.01); *B29C 66/721* (2013.01); *B29C 66/723* (2013.01); *B29C 66/7212* (2013.01); *B29C 66/7254* (2013.01); *B29C 66/73921* (2013.01); *B29K 2071/00* (2013.01); *B29K 2079/085* (2013.01); *B29K 2671/00* (2013.01); *B29K 2679/085* (2013.01); *B32B 37/144* (2013.01); *B32B 37/18* (2013.01); *B32B 2250/40* (2013.01); *B32B 2260/021* (2013.01); *B32B 2260/046* (2013.01); *B32B 2262/101* (2013.01); *B32B 2262/106* (2013.01); *B32B 2307/726* (2013.01); *B32B 2310/0418* (2013.01); *B32B 2371/00* (2013.01); *B32B 2379/08* (2013.01); *B32B 2605/00* (2013.01); *B32B 2605/18* (2013.01); *Y10T 156/1051* (2015.01); *Y10T 428/24149* (2015.01); *Y10T 428/31721* (2015.04)

(56) References Cited

U.S. PATENT DOCUMENTS

| | | | |
|---|---|---|---|
| 6,183,836 | B1 | 2/2001 | Pflug |
| 6,726,974 | B1 | 4/2004 | Pflug et al. |
| 7,208,223 | B2 * | 4/2007 | Ross .................... B32B 3/12 |
| | | | 428/116 |
| 2008/0268254 | A1 * | 10/2008 | Percec ................ B32B 27/08 |
| | | | 428/412 |

FOREIGN PATENT DOCUMENTS

| | | |
|---|---|---|
| DE | 10 2006 056 353 B3 | 12/2007 |
| DE | 10 2008 028 864 B4 | 4/2013 |
| EP | 0 274 789 A2 | 7/1988 |
| EP | EP 0274789 A2 * | 7/1988 ........... B29D 24/005 |
| EP | 2 011 826 A1 | 1/2009 |
| GB | 1150656 | 4/1969 |
| WO | WO 97/03816 A1 | 2/1997 |
| WO | WO 00/32382 A1 | 6/2000 |

OTHER PUBLICATIONS

German Office Action dated Jan. 21, 2015 (seven (7) pages).
European Office Action issued in European counterpart application No. 15 001 549.3-1377 dated Apr. 18, 2017 (Five (5) pages).

* cited by examiner

SANDWICH COMPONENT AND METHOD FOR PRODUCING A SANDWICH COMPONENT

CROSS REFERENCE TO RELATED APPLICATIONS

This application claims priority under 35 U.S.C. §119 from German Patent Application No. 10 2014 007 511.7, filed May 23, 2014, the entire disclosure of which is herein expressly incorporated by reference.

This application contains subject matter related to U.S. application Ser. No. 14/719,568, entitled "Sandwich Component and Method for Producing a Sandwich Component" filed on even date herewith.

BACKGROUND AND SUMMARY OF THE INVENTION

The present invention relates to a sandwich component, i.e., a component in which materials having various properties are assembled in layers, wherein these material layers comprise at least two cover layers and a core disposed therebetween. The invention further relates to a method for producing a sandwich component.

Known sandwich components usually comprise a relatively thick, but lightweight, core, which is disposed between two relatively thinner, but mechanically more stable, cover layers and is connected (e.g., bonded) to these cover layers.

Such components produced in a sandwich design can be used particularly advantageously in lightweight construction, e.g., as components for aircraft construction.

In the case of known sandwich components, the core is often made of a foamed material, or, e.g., of a so-called honeycomb structure (e.g., made of paper, cardboard, plastic, or metal). In the prior art, sheet metal, wood or plywood, or fiber composite materials, for example, are used, inter alia, as cover layers.

A basic problem with the production of a sandwich component in terms of the stability of the finished component is that of achieving a best possible (mechanically loadable) connection of the cover layers at the core.

One possibility therefor is an "adhesive connection", i.e., connecting the core to the cover layers by use of an adhesive or a hot melt adhesive layer.

Depending on the properties of the materials to be bonded together, this method, however, often results in the disadvantage of inadequate strength of the adhesive connection.

In order to prevent this disadvantage, one possibility is to connect the cover layers to the core by use of a "cohesive connection", i.e., by means of a hot melt connection between the core layers and the cover layers, without the use of an additional material. To this end, the materials that are adjacent to one another are softened or melted, are joined under pressure, and are re-hardened.

Apart from the fact that this cohesive connection presupposes the selection of materials that can be softened or melted and, in addition, are appropriately compatible (i.e., can be fused with one another), this method often results, in practical application, in the serious disadvantage (or a reason to not use this method) that the cover layers and/or the core are damaged by the softening or melting of the materials and the joining under pressure.

This problem is particularly serious, for example, when the intention is to use a honeycomb structure formed from a thermoplast material as the core. An application of temperature and pressure on such a honeycomb structure, which is carried out in order to create a cohesive connection, usually results in an unwanted and disadvantageous deformation or a "collapse" of the honeycomb structure.

A problem addressed by the present invention is that of providing a sandwich component and a method for the production of a sandwich component, in which the aforementioned problems are avoided.

This problem is solved according to the invention by a sandwich component, and a production method for the sandwich component, wherein the sandwich component comprises a first cover layer, a second cover layer, and a core disposed therebetween. The cover layers are each formed from an outer layer made of a fiber-reinforced thermoplast material having greater resistance to a certain solvent and, fused therewith, an inner layer made of a thermoplast material having a lower resistance to the solvent. The core has outer layers, each of which is formed from a thermoplast material having lower resistance to the solvent, and an inner structure, which is formed entirely or partially from a thermoplast material having greater resistance to the solvent. The inner layers of the cover layers were each fused with one of the outer layers of the core with the use of the solvent.

In the method according to the invention for producing such a sandwich component, initially the first cover layer, the second cover layer, and the core are provided (prefabricated).

Next, the cover layers are partially dissolved on the sides of the inner layers of the cover layers facing the core in the finished sandwich component, by the application of a predetermined solvent. The core is partially dissolved on the sides of the outer layers of the core facing the cover layers in the finished sandwich component, by the application of the predetermined solvent.

The essential point is the use of a solvent that attacks the aforementioned "thermoplast materials having greater resistance" hardly to not at all, in particular, does not soften these to a notable extent, but this solvent attacks the aforementioned "thermoplast materials having lower resistance" and, in particular, softens these to an extent that is adequate for the subsequent fusion.

Finally, each of the inner layers of the cover layers that is partially dissolved by use of the solvent that is used is joined to one of the partially dissolved outer layers of the core and is therefore fused.

The term "fused" means, very generally, that the relevant thermoplast materials were brought to at least the softening temperature (in the case of various thermoplast materials, this is the greater of the two softening temperatures), at least on the surfaces thereof, and were joined to one another in this state, or that the relevant thermoplast materials were softened (partially dissolved) and joined to one another by the application of a solvent, at least on the surfaces thereof, wherein, in this fusion procedure, a more or less great diffusion of the materials of the joining partners into one another and, therefore, a "cohesive connection" takes place in every case. In this context, the term "softening temperature" refers to a temperature at which the relevant material softens or melts such that a cohesive connection can be created by means of joining another material thereto, which has also been softened or melted. The expression "softened (partially dissolved) by the application of a solvent" refers to an attack in which the relevant material is softened to the extent that a cohesive connection can be created by joining another material thereto, which has also been softened or melted.

The expressions "greater resistance" and "lower resistance" (to the predetermined solvent) are intended to mean, within the scope of the invention, that a thermoplast material having greater resistance is attacked hardly to not at all (in particular, does not soften to a notable extent) when the solvent is applied, while the thermoplast material having lower resistance is strongly attacked and is thereby softened (partially dissolved) when the same solvent is applied (and under the same application conditions, such as temperature and exposure time).

In this context, the term "softened (partially dissolved)" refers to a state in which the relevant material can be fused by joining another material thereto, which has also been softened or melted.

Within the scope of the invention, it is in no way ruled out that a plurality of various "thermoplast materials having greater solvent resistance"—also referred to in the following as "solvent-resistant thermoplast materials"—and/or a plurality of various "thermoplast materials having low solvent resistance"—also referred to in the following as "non-solvent-resistance thermoplast materials"—are present in the sandwich component or are processed in the production process.

In other words, the expressions "greater resistance" and "lower resistance" refer to the situation in which at least one certain solvent can be indicated, along with the application conditions (e.g., the temperature and duration of application), such that the solvent-resistant thermoplast material(s) are not softened (partially dissolved) in a manner suitable for fusion when applied, while the non-solvent-resistant thermoplast material(s) are softened (partially dissolved) in a manner suitable for fusion by means of the same application.

A person skilled in the art has access to diverse possibilities for specifically selecting the solvent to be predefined for the invention or to be used in the production process and, therefore, in association therewith, for specifically selecting thermoplast materials that are "resistant" and "non-resistant" to this solvent. It is advantageously possible, in this regard, to access previously published tables and reference works related to the particular resistance of a multiplicity of thermoplast materials to certain solvents.

Methods that can be used within the scope of the invention to determine or characterize and predict resistances of materials to solvents are described, e.g., in "Hansen Charles M., Hansen Solubility Parameters—A User's Handbook", Second Edition, CRC Press, Taylor & Francis Group, 2007, ISBN: 0-8493-7248-8".

As explained above, a unique feature of the sandwich component according to embodiments of the invention is that the cover layers are each formed from an outer layer made of a fiber-reinforced "solvent-resistant" thermoplast material and, fused therewith, an inner layer made of a "non-solvent-resistant" thermoplast material that is different therefrom. Each of the cover layers therefore has two layers, which, however, are fused with one another (thermally or, alternatively, by means of a suitable application of solvent) and, therefore, advantageously, are cohesively connected to one another. In addition, a cohesive connection is also advantageously provided between the cover layers and the core in that, by way of a suitable application of solvent, the respective outer layers of the core formed from a "non-solvent-resistant" thermoplast material are likewise fused with the respective inner layers of the cover layers, which are formed from a "non-solvent-resistant" thermoplast material.

The sandwich component according to embodiments of the invention therefore has all the advantages of the initially explained "cohesive connection" of the cover layers at the core, but thereby avoids the risk of incurring notable damage to the cover layers and/or the core within the scope of producing the sandwich components, because, in order to join the cover layers and the core to create the cohesive connection, it is possible to apply a solvent onto the cover layers and onto the core, which, in the case of the cover layers, selectively attacks and softens (partially dissolves) substantially only the inner layers of the cover layer and, in the case of the core, selectively attacks and softens (partially dissolves) substantially only the outer layers of the core.

In other words, the cover layers and the core can be advantageously joined and, therefore, fused such that neither the outer layers of the cover layers nor the inner structure of the core softens.

In one embodiment, the non-solvent-resistant thermoplast materials are identical to an inner layer of a cover layer and to the outer layer of the core fused therewith.

In a development of this embodiment, all the non-solvent-resistant thermoplast materials, i.e., those of the inner layers of the two cover layers and those of the outer layers of the core, are identical. If the non-solvent-resistant thermoplast materials of an inner layer of a cover layer and the outer layer of the core fused therewith are not selected to be identical, which is less preferred, however, then it is only necessary to ensure the compatibility thereof in the sense of a fusibility (miscibility) of the two materials.

In one embodiment, at least one of the thermoplast materials is selected from the group comprising ABS (acrylonitrile butadiene styrene), PA (polyamide), PBT (polybutylene terephthalate), PC (polycarbonate), PEEK (polyetheretherketone), PEI (polyetherimide), PES (polyethersulfone), PET (polyethylene terephthalate), PP (polypropylene), PPS (polyphenylene sulfide), PPSU (polyphenylsulfone), and PSU (polysulfone).

In an embodiment suited, in particular, for applications of the sandwich component in the aviation and aerospace industries, at least one of the thermoplast materials is selected from the group comprising, e.g., PEEK, PEI, PES, PPS, PPSU, PSU.

With respect to other applications as well, in particular, it is possible, e.g., that at least one of the thermoplast materials is selected from the group comprising ABS, PA, PBT, PC, PP.

In one embodiment, the solvent-resistant thermoplast material is PEEK (e.g., resistant to dichloromethane (DCM)), for at least one (or both) outer layers of the cover layers and/or the inner structure of the core.

In one embodiment, the non-solvent-resistant thermoplast material is PEI (e.g., not resistant to DCM), for at least one (or both) inner layers of the cover layers and/or at least one (or both) outer layers of the core.

In one embodiment, the outer layer of at least one of the cover layers is reinforced with carbon fibers. Instead of carbon fibers, other reinforcing fibers can also be provided, however, e.g., glass fibers. At least it is expedient to reinforce the outer layers of the cover layers with fibers of the same type, i.e., both outer layers, e.g., with carbon fibers or with glass fibers. It should not be ruled out, however, to reinforce the outer layers of the two cover layers with different types of fiber material.

The fibrous material, which is enclosed in the outer layers of the cover layers by the solvent-resistant thermoplast material as "matrix material", can be provided in each case, e.g., in the form of one or more layers of a fabric, a non-woven material, or a mesh. As an alternative or in addition, it is possible to provide "short fibers" that are matted in the matrix material.

The same type of matrix material can be selected for both cover layers. It should not be ruled out, however, to provide different solvent-resistant thermoplast materials for the outer layers of the two cover layers.

In one embodiment, PEEK is used as the matrix material for the outer layer of at least one, in particular both cover layers.

In one embodiment, PEI is used as the material for the inner layer of at least one, in particular both cover layers.

In one embodiment, in the case of at least one, in particular both cover layers, the thickness of the cover layer is at least 0.2 mm, in particular at least 0.4 mm.

In one embodiment, in the case of at least one, in particular both cover layers, the thickness of the cover layer is at most 6 mm, in particular at most 3 mm.

In one embodiment, in the case of at least one, in particular both cover layers, the thickness of the inner layer is at least 0.01-fold, in particular at least 0.1-fold the total thickness of the relevant cover layer.

In one embodiment, in the case of at least one, in particular both cover layers, the thickness of the inner layer is at most 0.5-fold, in particular at most 0.3-fold the total thickness of the relevant cover layer.

In one embodiment, the core of a foamed material layer (inner structure) is formed from a solvent-resistant thermoplast material having outer layers fused therewith, on both sides, each of which is formed from a non-solvent-resistant thermoplast material.

In another embodiment, the core is a so-called honeycomb core. Sandwich components having a honeycomb core are known from the prior art, e.g., having a honeycomb core made of cardboard, resin-impregnated paper, fibrous plastic, or thin aluminum foils.

In the case of the sandwich component according to embodiments of the invention, if the core is designed as a honeycomb core, this must comprise outer layers, which are formed from a non-solvent resistant thermoplast material, and a honeycomb-shaped inner structure, which at least partially comprises a solvent-resistant thermoplast material.

One possibility thereof would be, e.g., a honeycomb structure formed from the solvent-resistant thermoplast material (e.g., PEEK in the case of, e.g., DCM as the solvent), said honeycomb structure being fixedly connected on both sides to outer layers (outermost layers of "honeycomb structure cover layers"), each of which is made of a non-solvent-resistant thermoplast material (e.g., PEI in the case of, e.g., DCM as the solvent), in particular being (e.g., thermally) fused thereto.

In one embodiment, the two outer layers of the core are made of an identical non-solvent-resistant thermoplast material.

According to a preferred development of the embodiment having a honeycomb core, said honeycomb core is designed as a so-called folded honeycomb or a folded honeycomb structure.

A folded honeycomb structure is characterized in that this was formed starting from a flat body made of a plastically deformable material (e.g., thermoplastic plastic film), in that this body was plastically deformed (including having been "folded") such that this honeycomb structure results. Optionally, cuts can also be introduced into the flat material before the deformation and folding process is carried out.

With respect to the specific design of such a folded honeycomb structure or the production thereof, reference can be made, advantageously, within the framework of the invention, to the related prior art, for example. Patent documents WO 97/03816, WO 00/32382, DE 10 2006 056 353 B3 and DE 10 2008 028 864 B4 are mentioned merely as examples thereof.

The term "folded honeycomb structure" used here is intended to refer to structures having cell and honeycomb walls extending vertically (in the "sandwich direction") as well as structures having diagonally extending walls. In contrast, in the prior art (cf., e.g., DE 10 2006 056 353 B3 and DE 10 2008 028 864 B4), the initially mentioned structures are often also referred to as "honeycomb" structures, each of which has honeycombs having a hexagonal cross-section, and the second structures that are mentioned are referred to as folded honeycombs.

In one embodiment, the thickness of the core is at least 3 mm, in particular at least 6 mm or at least 10 mm.

In one embodiment, the thickness of the core is at most 50 mm, in particular at most 25 mm. With respect to the application of a use of the sandwich component (also) for thermal insulation, it is also contemplated, however, to provide the core (in particular, e.g., having an inner structure made of foamed material) with a thickness of more than 25 mm, e.g., up to a thickness of 100 mm or even 200 mm.

In one embodiment, it is provided for at least one, in particular both outer layers of the core that the thickness of the outer layer, which is formed from solvent-resistant thermoplast material, is at least 0.0001-fold, in particular at least 0.01-fold the total thickness of the core.

In one embodiment, it is provided for at least one, in particular both outer layers of the core that the thickness of the outer layer, which is formed from solvent-resistant thermoplast material, is at most 0.1-fold, in particular at most 0.05-fold the total thickness of the core.

A unique feature of the method according to embodiments of the invention for producing a sandwich component of the type described herein is to fuse the cover layers, which are specially designed (prefabricated) as described herein, with the core, which is specially designed (prefabricated) as described herein, with the use of a suitable solvent.

In order to provide the cover layers, it is advantageously possible in each case to fuse, e.g., a prefabricated outer layer (flat fiber composite material) with a prefabricated inner layer (e.g., assembled thermoplast film material) by using pressure and temperature, e.g., in a shaping tool or, e.g., in a continuous laminating process. As an alternative, it is possible to "apply" the inner layer "by lamination" already during the production of the fiber composite material (outer layer).

In order to provide the core, e.g., in a similar fusion process, a prefabricated foamed material layer made of a solvent-resistant thermoplast material can be provided, on both sides, with outer layers of a non-solvent-resistant thermoplast material.

In a preferred embodiment, however, in order to provide the core, a film of a solvent-resistant thermoplast material coated on both sides with a non-solvent-resistant thermoplast material is reshaped in order to form a folded honeycomb structure.

Such a method for producing a folded honeycomb structure, apart from the film of a solvent-resistant thermoplast material which, according to the invention, is coated with a non-solvent resistant thermoplast material for this purpose, can be advantageously made available according to methods known per se. An example thereof is the method described in WO 00/32382, which comprises the following steps of:
   providing a flat body made of a plastically deformable material, reshaping the flat body in strip-shaped regions to be polygonal, sinusoidal, or circular, wherein the strip-shaped regions located between these regions are formed entirely or not at all, in alternation, out of the plane of the flat starting body, and folding the polygonally, sinusoidally or circularly plastically deformed regions by approximately 90° relative to the strip-shaped regions.

The resultant folded honeycomb structure is then formed from a plurality of cells (honeycombs) arranged in rows, wherein the cells have lateral cell walls, which annularly adjoin one another and are delimited toward the opening sides of the cell by honeycomb cover layer levels, wherein the cells can be completely bridged in both honeycomb cover layer levels, in particular. The cell walls can be permanently connected to one another, entirely or partially, in this manner.

When a film composed of various thermoplast materials in layers, e.g., having an inner layer made of a solvent-resistant thermoplast material and, fused therewith on both sides thereof, outer layers each made of a non-solvent-resistant thermoplast material, is used as a flat starting body in this method, which is known per se, for producing a honeycomb structure within the scope of the invention, the result is a folded honeycomb core, which can be used in the invention, comprising outer layers (outermost layer of the honeycomb structure cover layers) made of the relevant, non-solvent-resistant thermoplast material and an inner structure, which is formed partially from a thermoplast material that is solvent-resistant and partially from a thermoplast material that is non-solvent-resistant (but which is advantageously located "on the inside" and, therefore, is not as easily attacked).

In the final step of the method for producing a sandwich component, the inner layers of the cover layers are each fused with one of the outer layers of the core by using the solvent.

In this case of fusion by using an application of the solvent, optionally also at a relatively high temperature, e.g., a temperature above room temperature, the solvent is initially allowed to act on the relevant joining surfaces at least until these joining surfaces have been softened (partially dissolved) to an extent that is suitable for fusion.

The duration of exposure of the solvent and/or a temperature that is applied in this case can also be selected to be greater than is absolutely necessary, wherein, in this case, it merely needs to be ensured that this "application condition" does not result in a substantial attack (softening) on the thermoplast material portions that are not involved in the joining process.

According to an advantageous development of the provision of the core as a folded honeycomb structure by reshaping a film of a solvent-resistant thermoplast material coated with a non-solvent-resistant thermoplast material, this coating is carried out only in regions, according to the specific shaping process, such that the non-solvent-resistant thermoplast material is present on the finished folded honeycomb structure only in the region of the folded honeycomb structure cover layers, but not in the region of the inner structure of the folded honeycomb structure. This development eliminates the risk that, in the final production step for the sandwich component with the use of the solvent, the other thermoplast portions that can be softened by the solvent and that are present in the inner structure are softened.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 7 depict the production of a sandwich component according to one exemplary embodiment.

Figure 6:
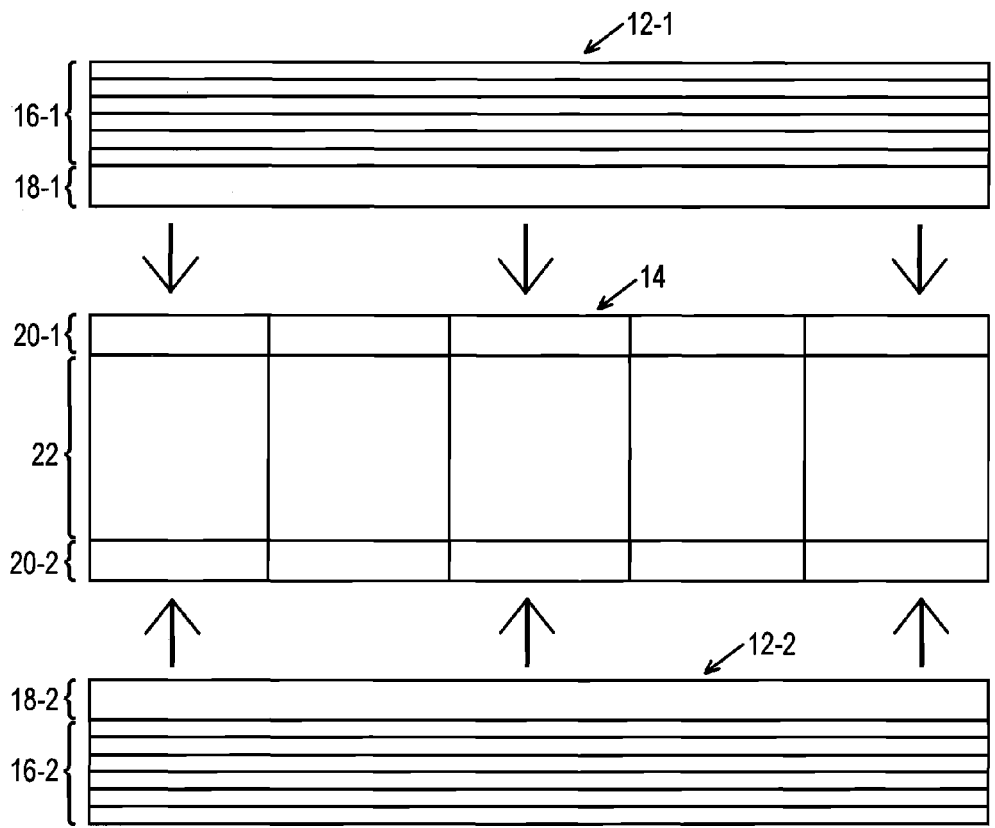
FIG. 6 shows a fabrication of the sandwich component by fusing two cover layers of the type depicted in FIG. 2 having a core prefabricated according to the method depicted in FIG. 5.
Figure 7:
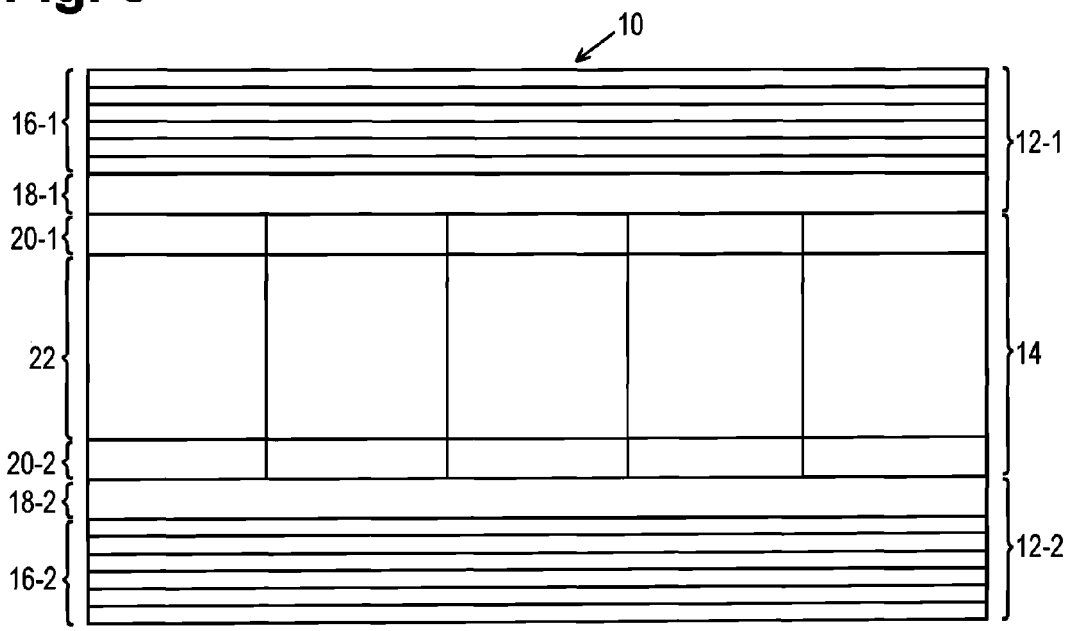
FIG. 7 shows the finished sandwich component.

The configuration of the finished sandwich component 10 will be addressed first, with reference to FIG. 7. Next, the method used to produce the sandwich component 10 will be described with reference to FIGS. 1 to 6.

FIG. 7 shows the finished sandwich component 10, comprising a first cover layer 12-1, a second cover layer 12-2, and a core 14 disposed therebetween.

The cover layers 12-1 and 12-2 are each formed from an outer layer 16-1 made of a fiber-reinforced thermoplast material having "greater resistance" to a predetermined solvent (e.g., DCM) and, fused therewith (e.g., thermally fused therewith), an inner layer 18-1 of a thermoplast material having "lower resistance" to the predetermined solvent.

In the example shown, the outer layer 16-1 is a fiber composite material, in the case of which a single- or multiple-layer carbon fiber material is embedded in a matrix of PEEK. In this example, PEEK is a thermoplast material of the cover layer 12-1 that is substantially resistant to an application of DCM, i.e., when DCM is applied, this thermoplast material is hardly attacked and, in particular, is not softened (partially dissolved) to a notable extent. Such a thermoplast material is referred to in the following simply as "solvent-resistant" or "DCM-resistant".

In contrast, the inner layer 18-1 in the example shown is formed from PEI, which, in this example, is a thermoplast material of the cover layer 12-1 that can be softened (partially dissolved) by application of DCM, for example. Such a thermoplast material is referred to in the following simply as "non-solvent-resistant" or "non-DCM-resistant".

The core 14 comprises outer layers 20-1 and 20-2 facing the cover layers 12-1, 12-2, respectively, each of which is formed from a non-DCM-resistant thermoplast material, specifically PEI in this case, and comprises a honeycomb-type inner structure 22, which is formed partially of DCM-resistant thermoplast material, specifically PEEK in this case, and partially of non-DCM-resistant thermoplast material, specifically PEI in this case.

The inner layers 18-1, 18-2 of the cover layers 12-1, 12-2 are fused with one of the outer layers 20-1, 20-2, respectively, of the core 14, wherein the fusion was carried out by the mutual joining of the relevant fusion (joining) surfaces by application of DCM.

The sandwich component 10 can be used particularly advantageously, e.g., as a component, in particular as a horizontally extended component (fuselage section, panel, etc.) in vehicle or aircraft construction.

FIGS. 1 to 6 show individual steps or stages in the production of the sandwich component 10 depicted in FIG. 7.

In a first step, the cover layers 12-1, 12-2 and the core 14 are prefabricated.

Figure 1:
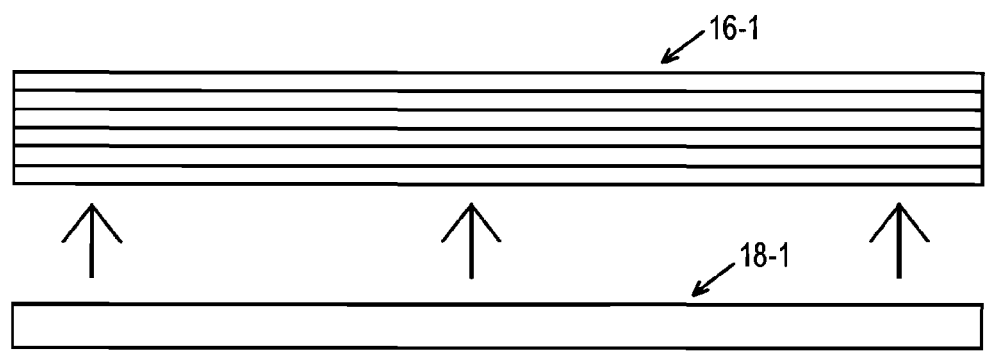
FIG. 1 shows a prefabrication of a cover layer for a sandwich component.
Figure 2:
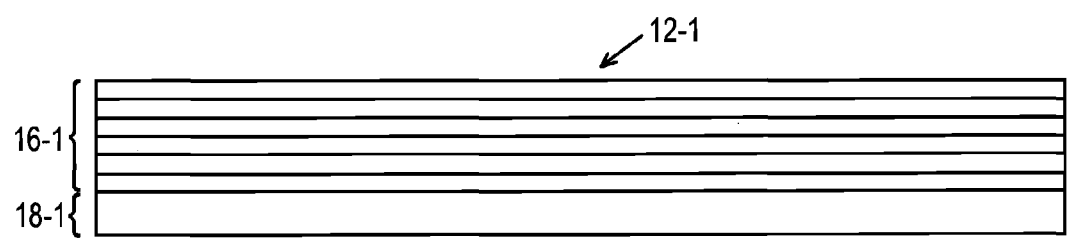
FIG. 2 shows the prefabricated cover layer.

The prefabrication of the cover layers 12-1 and 12-2 is carried out—as illustrated in FIG. 1 for the cover layer 12-1 as an example—by a mutual fusion (cohesive connection, preferably by means of thermal fusion) of the outer layer 16-1, which was previously produced using composite fiber technology, with the inner layer 18-1, which was previously produced, e.g., by extrusion. The resultant product, i.e., the cover layer 12-1, is depicted in FIG. 2. The prefabrication of the second cover layer 12-2 takes place in a similar manner. As an alternative to a purely thermal fusion of the outer layer 16-1 and the inner layer 18-1, these layers 16,1, 18-1 could be fused with one another, e.g., also with the use of a solvent, wherein the two materials, PEEK and PEI, can be softened (partially dissolved) in a manner suitable for such a fusion by the application of said solvent.

In deviation from the method illustrated in FIGS. 1 and 2, it is possible to "apply" the inner layer "by lamination" already during the prefabrication of the outer layer, i.e., to embed the fibrous material in the outer layer and connect the inner layer in one step, e.g., in a shaping tool.

Figure 3:
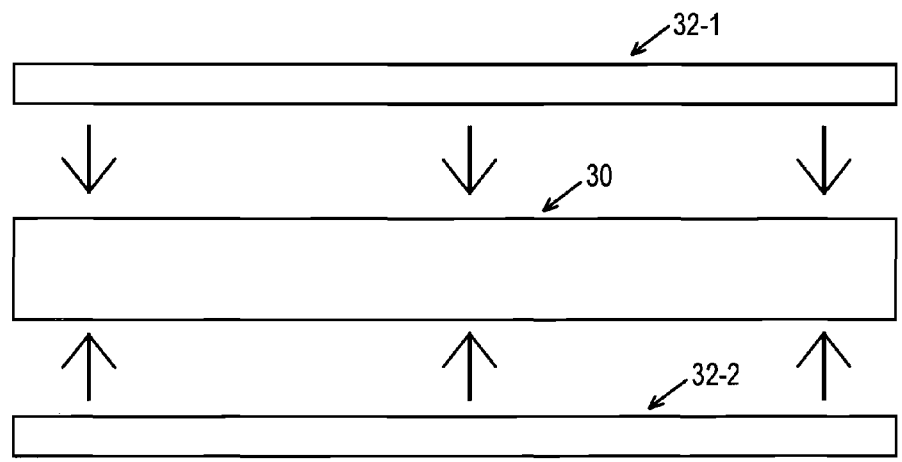
FIG. 3 shows a prefabrication of a thermoplast film for use as the starting material for producing a folded honeycomb structure.
Figure 4:
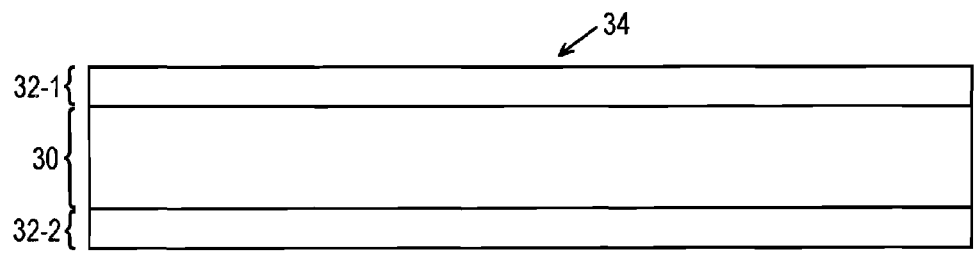
FIG. 4 shows the prefabricated thermoplast film.
Figure 5:
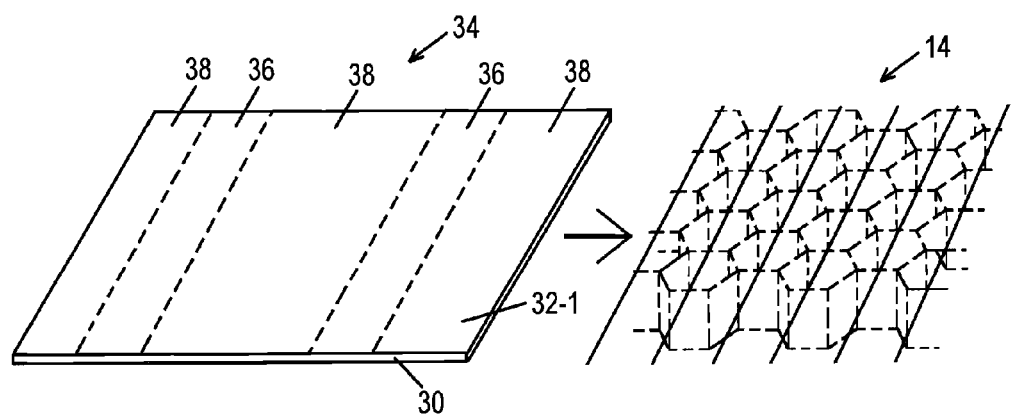
FIG. 5 shows a prefabrication of the folded honeycomb structure made of the thermoplast film depicted in FIG. 4.

The prefabrication of the core 14 is illustrated in FIGS. 3 to 5.

First, as shown in FIG. 3, a prefabricated film 30 made of PEEK is coated on both sides with films 32-1 and 32-2 made of PEI. Preferably, the film 30 and the films 32-1, 32-2 are cohesively connected to one another, i.e., are fused (preferably thermally in this case as well).

The resultant product is a compound film 34, which is shown in FIG. 4.

Next, as symbolized in FIG. 5, a folded honeycomb structure, which is the core 14 (FIG. 5, right) is created by means of a reshaping process with the compound film 34 as the starting material (FIG. 5, left).

In the example shown, the core 14 is therefore formed as a so-called folded honeycomb or a folded honeycomb structure. With respect to the reshaping process used therefor, reference can be advantageously made to the related prior art.

In the example shown, a reshaping process was selected, by which, in particular, upper and lower "honeycomb structure cover layers" were also formed from the correspondingly shaped (and folded) starting material 34.

Since these honeycomb structure cover layers (as well as the inner structure) are formed from the compound film 34 and, in this compound film 34, both surfaces of the films 32-1, 32-2 are formed from PEI, i.e., from a non-DCM-resistant thermoplast material, it is ensured that the core 14 resulting from the reshaping process has outer layers 20-1, 20-2 made of non-DCM-resistant thermoplast material.

The latter is significant for the final step in the production of the sandwich component, which is illustrated in FIG. 6. In this step, the prefabricated core 14 is disposed between the two cover layers 12-1, 12-2, as shown. Next, the inner layers 18-1, 18-2 of the cover layers 12-1, 12-2 are fused with one of the outer layers 20-1, 20-2, respectively, after application of DCM at least on the joining surfaces to be fused together, with the application of pressure and, optionally, at a relatively high temperature, e.g., a temperature above room temperature. The result is the finished sandwich component 10 depicted in FIG. 7.

In the above-described exemplary embodiment, the film 30 made of PEEK was completely coated on both sides with the films 32-1 and 32-2 made of PEI.

As a result, the inner structure of the core 14 is formed partially of PEEK (film 30) and partially of PEI (films 32-1, 32-2).

In the final production step for the sandwich component, care must be taken to ensure that largely no unwanted damage occurs, e.g., softening of the thermoplast portions present in the inner structure 22 of the core 14, which are not resistant to the relevant solvent, specifically DCM in this case. This can be taken into account in practical application, e.g., by setting the process conditions for the application of the relevant solvent, which is DCM in this case, such that this solvent does not penetrate the region of the inner structure 22 of the core 14 to a notable extent or in harmful quantities.

With respect to this aspect, according to an advantageous development of the provision of the folded honeycomb structure by reshaping a film made of a solvent-resistant thermoplast material coated with a non-solvent-resistant thermoplast material, this coating is carried out only in regions, according to the specific reshaping process, such that the non-solvent-resistant thermoplast material is present on the finished folded honeycomb structure only in the region of the folded honeycomb structure cover layers.

Therefore, e.g., the above-described exemplary embodiment could be advantageously modified such that the PEI coating on both sides of the PEEK film 30, as illustrated in FIGS. 4 and 5, is not carried out over the entire surface, but rather only in strip-shaped regions 36 as indicated by dashed lines in FIG. 5, said strip-shaped regions alternating with non-coated regions 38 in the processing direction of the compound film 34, wherein the width of the strips 36 and 38 relative to the processing direction is selected such that, as a result of the reshaping process, the inner structure 22 of the core 14 is formed only from the non-coated regions 38, i.e., PEEK, whereas the cover layers 20-1 and 20-2 of the core 14 are formed from the PEI-coated regions 36, in the compound with the PEEK film 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sandwich component, comprising:
   a first cover layer, a second cover layer, and a core disposed therebetween, wherein
   the first and second cover layers are each formed from an outer layer made of a fiber-reinforced PEEK and, fused therewith, an inner layer made of PEI,
   the core has outer layers each of which is formed from PEI, and an inner structure, which is formed entirely or partially from PEEK, and
   the inner layers of the cover layers are each fused with one of the outer layers of the core with the use of an organic solvent.

2. The sandwich component according to claim 1, wherein the core is a honeycomb core.

3. The sandwich component according to claim 2, wherein the honeycomb core is a folded honeycomb structure.

\* \* \* \* \*